United States Patent [19]

Lopez-Crevillen

[11] Patent Number: 4,527,710

[45] Date of Patent: Jul. 9, 1985

[54] SEALING COVERS FOR AIR BOXES

[75] Inventor: Jose M. Lopez-Crevillen, Westland, Mich.

[73] Assignee: General Motors Corporation, Detroit, Mich.

[21] Appl. No.: 635,599

[22] Filed: Jul. 30, 1984

[51] Int. Cl.³ .............................................. B65D 53/00
[52] U.S. Cl. ................................. 220/378; 123/195 C
[58] Field of Search ....................... 220/378; 184/106; 123/195 C, 195 A, 195 B

[56] References Cited

U.S. PATENT DOCUMENTS 1,737,466 11/1929 Lynd .
3,018,127 1/1962 Dolrosielski et al. ............... 220/378
3,317,224 5/1967 Kuskevics et al. .................. 220/378
3,888,226 6/1975 Wallace .
4,213,620 7/1980 Kennedy et al. .

OTHER PUBLICATIONS

Service Manual 6SE380, Detroit Diesel Engines Series 92, pp. 13, 14, Detroit Diesel Allison, Detroit, 1981.

Primary Examiner—George T. Hall
Attorney, Agent, or Firm—Robert J. Outland

[57] ABSTRACT

A plate-like sealing element and method of making are disclosed by the specific embodiments of an engine air box cover and a water elbow attaching flange. The sealing members are formed from plate material using fine blanking to define the edges and partial shearing to accurately form a sealing groove along one surface and a stiffening rib extending from an opposite surface in a location directly opposite the sealing groove to further stiffen the sealing member.

6 Claims, 6 Drawing Figures

SEALING COVERS FOR AIR BOXES

TECHNICAL FIELD

This invention relates to sealing covers, such as air box covers for internal combustion engines, to flanged connection elements, and the like and to methods of making such articles through processes including forming, fine blanking and partial shearing of plates.

BACKGROUND

Sealing connections, such as are used for sealing covers, flange pipe connections and the like, may be made by various methods. For example, the covers or flanges may be cast and have their peripheries machined to provide a flat sealing surface which engages a gasket to seal an opening or the periphery of an associated connection. Alternatively a seal groove for a resilient O-ring seal or its equivalent may be machined in the surface to seal the joint. Covers and flanges may also be made by cutting them from steel plate, or the like, thick enough to provide a stiff sealing connection, in combination with a gasket or an O-ring seal disposed in a machined groove.

SUMMARY OF THE INVENTION

The present invention provides an improved sealing element, such as a sealing cover, a flanged pipe connection or other similar element, wherein lighter plate stock is utilized to form a member or element with greater economy of material and formed with a minimum of steps (which may be concurrent) including forming, fine blanking, and partial shearing to form a seal ring groove and raised stiffening rib.

The invention provides advantages of lower material and manufacturing cost with adequate structural rigidity and improved performance, as will be more fully understood from the following description of certain preferred embodiments taken together with the accompanying drawings.

BRIEF DRAWING DESCRIPTION

DETAILED DESCRIPTION

Figure 1:
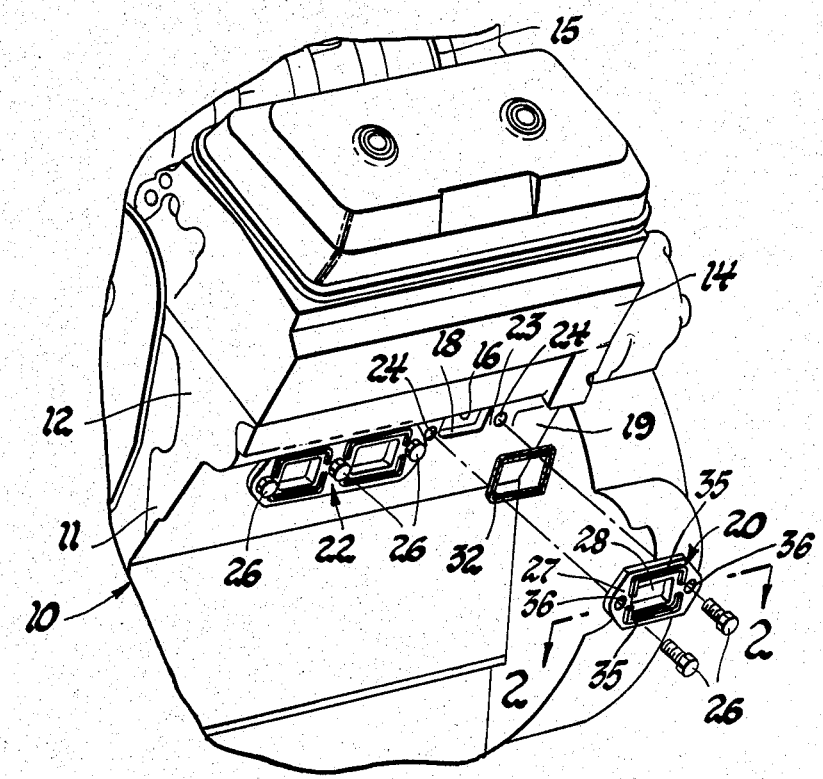
FIG. 1 is a fragmentary pictorial view of a partially assembled two-stroke cycle diesel internal combustion engine showing the application thereto of air box covers formed in accordance with the invention.

Referring first to FIG. 1-4 of the drawings, there is shown a two-stroke cycle diesel engine generally indicated by numberal 10. Engine 10 includes a crankcase and cylinder block 11 defining a pair of cylinder banks 12 closed by cylinder heads 14 only one of which is shown.

An engine driven blower 15 mounted on the cylinder block 11 delivers scavenging and charging air to an air box 16 within the cylinder block. The air box is a chamber surrounding the engine cylinders, not shown, which can be inspected through individual air box openings 18 formed in the side walls 19 of the cylinder block. In assembly, the openings 18 are closed by suitable cover members including a single opening cover 20 and a double opening cover 22 for each cylinder bank, only one being shown.

Around each opening 18, the side walls 19 are provided with outwardly facing peripheral flat sealing surfaces 23. Threaded openings 24 for receiving bolts 26 are provided to retain the covers in place.

Figure 2:
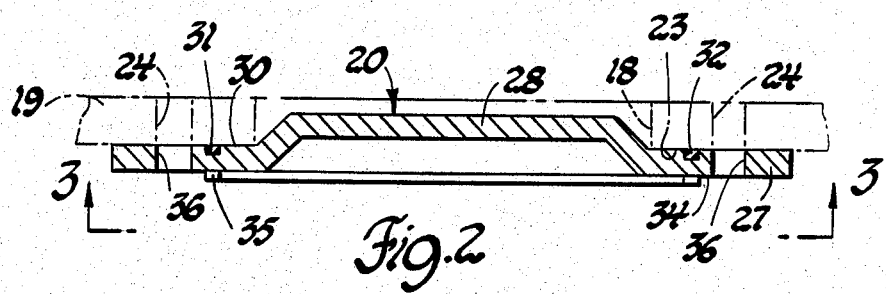
FIG. 2 is cross-sectional view of one of the covers taken in the plane generally indicated by the line 2—2 of FIG. 1.
Figures 3, 4:
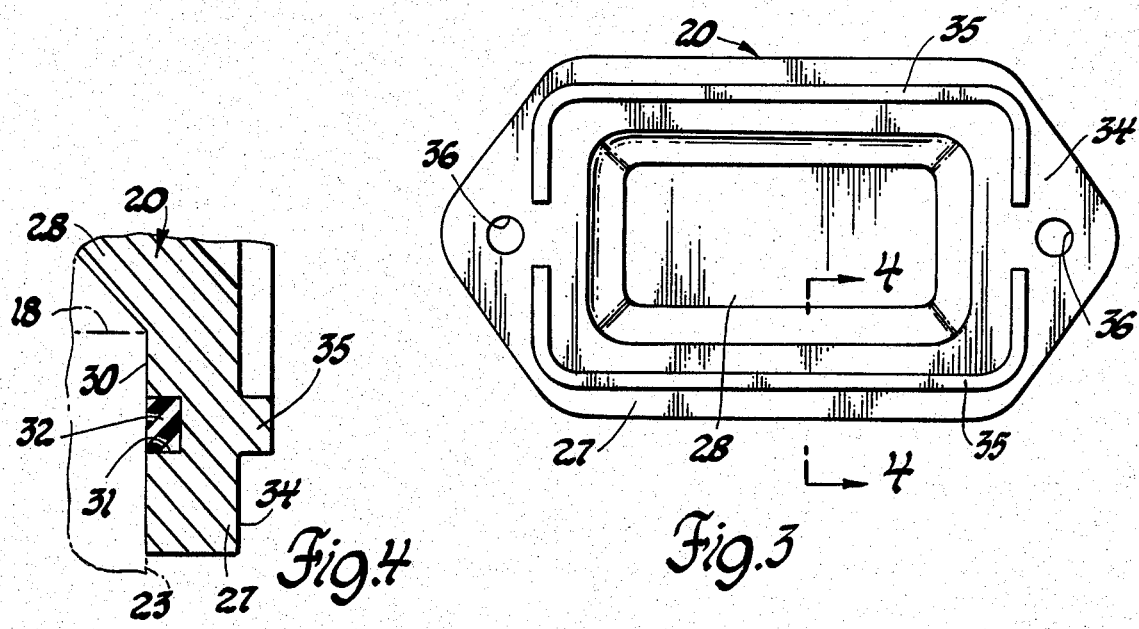
FIG. 3 is an exterior plan view of the cover from the plane indicated by the line 3—3 of FIG. 2.
FIG. 4 is an enlarged cross-sectional view of the sealing and stiffening portion of the cover from the plane indicated by the line 4—4 of FIG. 3.

In accordance with the invention, and as is best shown in FIGS. 2-4, the covers represented by cover 20, for example, are formed from relatively thin but stiff plates of formable material which, in the present application, is preferably steel but could be another suitable metal or nonmetal material if desired. The cover 20 includes a generally flat peripheral border portion 27 surrounding an inwardly dished center 28 which not only helps provide stiffness to the border portion but also extends into the associated air box opening 18 to reduce the collection of lubricating oil or other material in the covered opening during operation of the engine.

Adjacent each inwardly dished center 28, the covers 20, 22 are provided, on inner surfaces 30 facing the side wall sealing surfaces 23, with peripheral seal ring grooves 31. These grooves 31 are preferably of conventionally shaped square-edged cross-section and extend completely around the center 28 to receive a continuous resilient seal ring 32. The seal ring is preferably of essentially rectangular shape but may be formed with a circular, or other suitable, cross-section if desired.

On the outer surface 34 of the border portion 27 and directly opposite each seal groove 31, a raised stiffening rib 35 extends along the border portion completely around each center 28 except, optionally, at spaced locations where bolt receiving openings 36 are provided along the periphery to receive the fastening bolts 26 provided for securing the covers to the side walls 19 of the engine.

As shown, the openings 36 are disposed at longitudinally extreme ends of the shorter single cover 20 and at the center and ends of the longer double cover 22. At these locations, the raised stiffening rib 35 is interrupted so as to provide clearance for the retaining bolt head, a washer if required and/or a removal tool such as a wrench socket. Depending on the design of the cover, this interruption of the stiffening rib is optionally provided where needed. In either case, the rib 35 stiffens the border portion 27 intermediate the securing openings 36 so as to maintain the flatness of the inner surfaces 30 and provide positive sealing, when assembled, between the seal ring 32 and the sealing surfaces 23 of the engine side walls.

Further in accordance with the invention, the air box covers 20, 22, previously described, may be manufactured in relatively simple fashion using in novel combination known forming and blanking processes. The covers are formed using initially flat steel plates of thin but stiff character. These are formed and blanked in one or more processing steps that include the elements of (1) forming a dished central portion while maintaining the border portion flat; (2) fine blanking the outer edges and the openings 36 flash-free to close tolerances; and (3) partially shearing and punching the border portion to form the peripheral seal grooves 31 around each center while, at the same time, forcing upwardly on the other side the raised ribs 35 which assist in stiffening the border portion.

Interrupted portions of the raised ribs 35 may be provided during the forming step by designing the dies to prevent shearing of this portion of the outer surface 34, thereby requiring redistribution of displaced metal from the groove on the inner surface at this point. Alternatively, the rib can be formed as a continuous element and portions thereof adjacent the securing openings be subsequently removed by spot facing or another suitable machining operation.

As can be seen, a cover made in accordance with the described structure and method provides a relatively lightweight cover formed with a minimum of machining and efficiently using a minimum amount of material to provide a sealing cover having suitable stiffness for positively engaging and closing the air box inspection openings 18 in the engine side wall, thus providing both an economical and practical cover.

Figure 5:
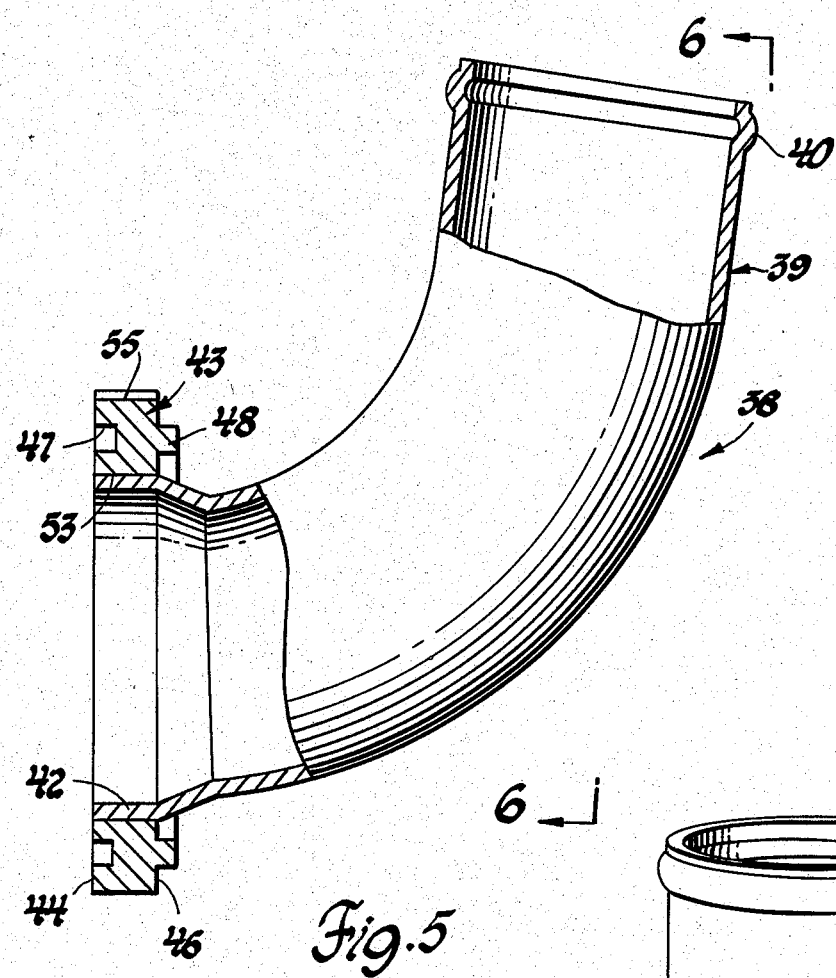
FIG. 5 is a side view of a water outlet elbow partially broken away to show its interior and the structure of associated sealing flange means in accordance with the invention.
Figure 6:
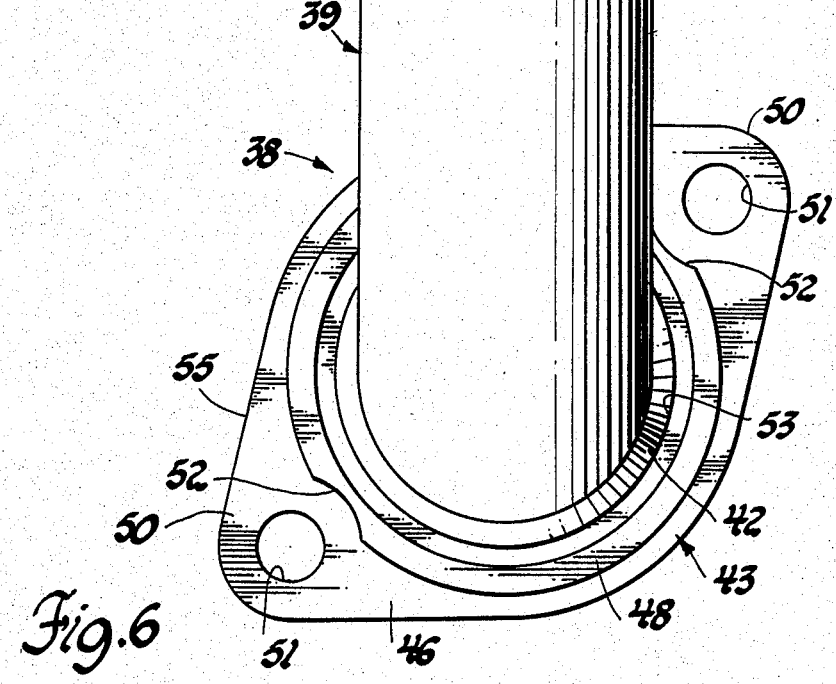
FIG. 6 is an end view of the outlet elbow from the plane indicated by the line 6—6 of FIG. 5.

In another application of the principles of the invention, FIGS. 5 and 6 disclose an exemplary embodiment comprising a water outlet elbow 38 having a tubular body 39. The body is formed with a raised rib 40 at one end adapted to receive a coolant hose and is enlarged at the other end 42 to which a sealing flange 43 is brazed or otherwise secured.

The flange 43 comprises a generally flat peripheral member having a flat inner sealing surface 44 and an opposed outer surface 46 and is formed of suitable material such as thin but stiff steel plate. A seal receiving groove 47 is formed along the inner surface extending peripherally around the enlarged end 42 of the tubular body 39. A stiffening rib 48 is provided on the outer surface directly opposite and aligned with the groove 47. Oppositely disposed ears 50 on the flange are provided with bolt receiving openings 51 for receiving securing bolts or other fasteners not shown. Portions of the rib 48 may be cut away as at 52 to provide clearance for the bolt heads or removal tools.

Manufacture of the flange 43 for assembly to the tubular body 39 may be accomplished in the fashion previously described for the covers 20 by fine blanking the inner and outer edges 53, 55 of the flange while at the same time partially shearing the material between the edges to form the seal groove 47 and the raised stiffening rib 48 on the opposite side. The resulting structure provides a light but stiff flange element adapted to provide a sealing connection with a mating member having a flat sealing surface opposing the seal groove.

The described embodiments are but exemplary of numerous applications wherein a partial shearing or blanking process may be utilized for forming a sealing member or element in which a suitably shaped peripheral seal groove is provided, in a flat inner surface of a sealing element adapted to engage the sealing surface of another member, while a stiffening rib is provided along an outer surface directly opposite the seal groove and adapted to stiffen the sealing member or element along the length of the seal groove, at least intermediate spaced securing locations. Since the features and advantages of the structure and method of making a sealing element in accordance with the invention can be applied to many conceivable applications, it is intended that the invention not be limited to the disclosed embodiments but it have the full scope permitted by the language of the following claims.

The embodiments of the invention in which an exclusive property or privilege is claimed are defined as follows:

1. A plate-like steel element having a body of formable material of relatively thin but stiff configuration and defining opposite faces, an essentially straight sided seal groove in one of said faces and adapted to receive a resilient seal, said one face being engageable with a smooth surface to maintain the seal in sealing engagement with said surface, and a stiffening rib on the other of said face and extending parallel with and directly opposite said groove to stiffen said element along the extent of said groove and rib, whereby a highly effective seal element is provided.

2. An element as in claim 1 wherein said groove and rib are formed concurrently by a partial blanking process.

3. A sealing cover for an engine air box or the like, said cover comprising a formable metal body of relatively thin but stiff configuration and having a peripheral portion defined by opposite faces, an essentially straight-sided seal groove in one of said faces and extending peripherally around said cover plate, said groove being adapted to receive a resilient seal and said one face being engageable with a smooth surface to maintain the seal in sealing engagement with said surface, and a stiffening rib protruding from the other of said faces and extending parallel with and directly opposite said groove to stiffen said cover peripheral portion along the extent of said groove and rib.

4. A cover as in claim 3 wherein said groove and rib are formed concurrently by a partial blanking process.

5. A sealing flange for a fluid conduit or the like, said flange comprising a formable metal body of relatively thin but stiff configuration and defining a peripheral portion having opposite parallel faces, an essentially straight-sided seal groove in one of said faces and extending peripherally around said flange, said groove being adapted to receive a resilient seal and said one face being engageable with a smooth surface to maintain the seal in sealing engagement with said surface, and a stiffening rib protruding from the other of said faces and extending parallel with and directly opposite said groove to stiffen said flange along the extent of said groove and rib.

6. A flange as in claim 5 wherein said groove and rib are formed concurrently by a partial blanking process.

* * * * *